United States Patent

[11] 3,607,226

| [72] | Inventor | Richard D. Burlingame |
| | | Cleveland, Ohio |
| [21] | Appl. No. | 749,612 |
| [22] | Filed | Aug. 2, 1968 |
| [45] | Patented | Sept. 21, 1971 |
| [73] | Assignee | Luria Brothers & Company, Inc. |
| | | New York, N.Y. |

[54] FERROUS MELTING STOCK CONTAINING A CARBON ADDITIVE AND METHOD
2 Claims, No Drawings

[52] U.S. Cl. .................................................. 75/44 R,
  75/48, 117/100 M
[51] Int. Cl. ......................................... C21b 1/08,
  C21b 11/00, C21c 5/56
[50] Field of Search ............................. 75/44, 48;
  117/100 M

[56] References Cited
UNITED STATES PATENTS

| 943,724 | 12/1909 | Weisz | 75/44 |
| 1,065,855 | 6/1913 | Weiss | 75/44 |
| 1,075,135 | 10/1913 | Alton | 75/44 |
| 1,291,672 | 1/1919 | Sutcliffe | 75/44 X |
| 1,303,799 | 5/1919 | Jarvis | 75/44 |
| 1,574,878 | 3/1926 | Gail | 75/44 |
| 3,107,166 | 10/1963 | Behr | 75/44 |
| 3,185,563 | 5/1965 | Jones et al. | 75/1 |
| 3,234,010 | 2/1966 | Mahony | 75/44 X |
| 3,316,083 | 4/1967 | Parsons | 75/44 |
| 765,724 | 7/1904 | Atha | 75/48 |
| 2,530,459 | 11/1950 | Gilbert et al. | 75/48 |
| 2,620,268 | 12/1952 | Fourmanoit | 75/48 |

*Primary Examiner*—Henry W. Tarring, II
*Attorney*—Brumbaugh, Graves, Donohue and Raymond ABSTRACT: Ferrous material having a high surface to mass ratio is coated with a liquid composition comprising sodium silicate and finely divided carbon, and the coating is dried. The coated ferrous material is a suitable partial or total replacement for pig iron, or cast iron scrap in the production of cast iron or steel.

FERROUS MELTING STOCK CONTAINING A CARBON ADDITIVE AND METHOD

The present invention relates to a ferrous melting product containing added carbon which is suitable as a partial or total substitute for pig iron and cast scrap iron in preparing the charge for the production of cast iron or steel. The invention also relates to a method of preparing the improved ferrous melting stock.

The term "cast iron" is used to refer to three basic types, namely, gray cast iron, malleable cast iron and ductile cast iron. All of these types may be produced in cupolas, induction furnaces or arc furnaces. The major tonnage of cast iron produced in this country today is gray cast iron, produced in a standard cupola.

Gray cast iron requires a carbon content of about 3.0 percent to about 3.5 percent. Where a standard cupola installation is used to produce gray iron from an all steel charge a certain minimum of pig iron and/or cast scrap must be employed with the steel in order to attain the necessary carbon content in the melt.

A standard cupola is characterized by (a) the air blast is not preheated, (b) the shaft and well are lined with acid refractories, (c) as the result of (b) the furnace can operate only with an acid slag, and (d) the overall size of the unit is small so that retention time in the cupola is relatively short. This type of cupola is the most common form of melting equipment used in iron foundries, mainly because its capital and operating costs are much lower than those of any other type of furnace. The disadvantage of this apparatus is that it does not favor a high degree of carbon absorption by the charge from the coke.

In order to improve the conditions for carbon absorption in the cupola so that gray iron can be produced therein from a charge containing high percentages of low-carbon steel, the cupola must be completely modified. These modifications include (1) preheating the air blast to 1,000° F. or more, (2) lining the shaft with basic refractories, or no brick at all, and lining the well with carbon blocks, (3) operating the cupola with a basic slag, and (4) increasing the retention time. Conversions from a standard cupola to a more modern one is seldom feasible so that a completely new installation is usually required. The large capital outlay has discouraged the majority of small or medium sized foundries from modernizing their melting equipment.

It is thus seen that the limited ability of the standard cupola to carburize the charge is the largest obstacle confronting the foundryman and scrap broker in their attempts to use more steel scrap in the production of gray iron.

Some attempts have been made in the prior art to correct this deficiency of low-carbon steel scrap by carburization processes involving the heating of the scrap in the presence of finely divided carbon, the scrap being thereafter cooled and used as a part of a charge of a cupola. This expedient has not proven satisfactory, however, because of the excessive costs involved.

It has now been found that ferrous material can be treated in an inexpensive manner to provide a product which can be used in a standard cupola, induction furnace or arc furnace to make cast iron or steel. A ferrous melting stock is made by first providing ferrous material having a high surface-to-mass ratio. Such material may be provided, for example, by fragmentizing automobile bodies and other similar types of steel scrap in a hammer mill. The fragmentized scrap obtained by these processes have a high surface-to-mass ratio.

The scrap is then coated with a liquid comprising sodium silicate and a finely divided carburizing agent, and the coating is dried to form thereon an adherent coating of the sodium silicate and carburizing agent.

In order to form a successfully functioning carburizing envelope on the ferrous material with a high surface-to-mass ratio, a carbon containing coating must satisfy a number of difficult requirements, all of which are met by the products of the present invention. The following nine criteria are applicable.

1. The fluid coating applied to the ferrous material must set rapidly in a short curing step so that the coating does not drain off in a stockpile of the ferrous material and so that treated ferrous material does not set after it reaches the stockpile to form a solid mass.

2. The coating must have high impact strength and abrasion resistance, so that no significant portion of the coating will chip away during handling and transporting of the coated ferrous material. Further, the bond between the coating and the surface of the material must retain its toughness over a wide range of temperatures, from below 0° F. to above 100° F.

3. The coating must remain completely intact during prolonged winter stockpiling, which can present severe stresses due to repeated freezing and thawing, as well as embrittlement due to very low temperatures.

4. The coating must not run or deteriorate in any way during prolonged summer stockpiling when surface temperatures of ferrous material are often high.

5. The coating must be highly resistant to the solvent action of rain during summer stockpiling.

6. The coating must be structurally stable so that crystallographic changes or other "aging" effects do not cause it to disintegrate with time, regardless of the weather conditions.

7. During the course of heating and melting in the furnace, the coating must not flake off under the stresses of high temperature, the differential expansion characteristics of the ferrous material and the coating, and the abrasive grinding of fragments together (as during the descent through a cupola). The coating must remain reasonably intact up to 2,000° F., in order to satisfy the conditions for efficient carbon absorption by the ferrous material.

8. The coating must provide an envelope around the carbonaceous material which is relatively oxygen tight at high temperatures so that oxidation losses are low and carbon absorption by the steel is high. This envelope should also provide the important benefit of minimizing the loss of iron through oxidation as iron oxidation losses on thin gauge scrap, for example, can be excessive.

9. The coating must not contain significant quantities of other substances which would be:
   a. detrimental to the quality of the cast iron or steel, or
   b. sources of operating problems, such as excessive slag, refractory wear, furnace blows, too much dirt in the furnace gases, toxic effects, etc.

In addition to the above requirements, several other characteristics are highly desirable in order to minimize costs and to permit a practical operation. It should be possible to prepare coating baths running at least 40 percent carbon without encountering excessive viscosity and subsequently coating difficulties. This should also be possible without supplementary heating of the bath. High carbon concentrations minimize coating costs and problems associated with the carrier material.

Furthermore, it should be possible to apply the coating over run-of-the-mill scrap, for example, without the need for cleaning or other surface preparation, and good coating characteristics should be obtained with freshly produced hot fragmentized scrap as well as with cool material so that scrap coating can be done immediately after magnetic separation without interim cooling.

The fluid coating material should be easy to prepare and to handle, and should be nontoxic and nonirritating. The equipment for coating and curing should be relatively compact, and easy to operate and maintain, and the cost treatment should be low.

Low-carbon steel scrap is commercially available in a number of forms, depending upon the source of the scrap and the various forms have surface-to-mass ratios which cover a wide range. The following table illustrates this point.

TABLE 1

| | Typical Specific Surface |
|---|---|
| | (sq. ft. of surface/lb. of mass) |
| 1. No. 1 Heavy Melting Scrap | 0.02–0.2 |
| 2. No. 2 Heavy Melting Scrap | 0.2–0.4 |
| 3. (a) Fragmentized scrap made from stripped autobodies and a substantial amount of miscellaneous No. 2 Heavy Scrap (relatively uncommon) | 0.6–0.7 |
| (b) Fragmentized scrap made from stripped autobodies and miscellaneous No. 2 baleable scrap (Most common practice) | 0.7–0.9 |
| (c) Fragmentized scrap made from stripped autobodies and a substantial amount of industrial clips and other loose sheet (less common practice) | 0.9–1.1 |
| (d) Fragmentized industrial clips of all types, ranging from ⅛-inch stock down to 32 gauge, can-making stock | 0.4–5.0 |
| (e) Fragmentized scrap made from light gauge material only, down to 0.003" steel used for "thin tin" cans | 5.0–16. |

Low-carbon steel scrap in other forms is, of course, available. Baled sheet steel, for example, has a relatively large surface-to-mass ratio but may be unsatisfactory because the package is dense and the coating liquid would penetrate it only with difficulty. However, where the sheet steel is coated before the bundle is made, this form may be used according to the present invention.

Bushelling scrap has a ratio of surface-to-mass of the same order as that of the fragmentized scrap given above but the bushelings generally lack the feature of internal folds, pockets and cavities possessed by fragmentized scrap. These internal pockets augment the effect of the high surface in collecting and retaining the carbon coating.

While fragmentized low-carbon steel scrap is a preferred ferrous material to use in accordance with the present invention, it is recognized that other ferrous materials may be similarly treated to advantage. Alloy steel scrap, sponge iron, and prereduced iron pellets prepared in so-called "direct iron" production processes can also be provided with the carburizing coating in according with this invention. Thus, the term "ferrous material" as used in this specification, includes all of these enumerated base materials.

In accordance with the process of the present invention, it is preferred that the ferrous material to which the coating is applied has from about 0.4 to about 5.0 square feet of surface area per pound of untreated material. Within this range, a more preferred value of 0.7 to 1.4 square feet of surface per pound of material is indicated. This more preferred range describes the scrap product obtained from typical fragmentizing plants operating on stripped auto bodies and miscellaneous baleable scrap. Also included in this category is the product of industrial clip shredders operating on materials as thin as 20 gauge from which the bulk of automotive and appliance stampings are made. Ferrous material having a specific surface much less than 0.4 square feet per pound does not pick up enough carbon to provide the desired increase in carbon content of the melt. On the other hand, ferrous material having a surface-to-mass ratio greater than 5.0 will pickup more carbon than desired, thus producing a material having a lower iron content.

The coating used in accordance with the present invention may contain any one of a number of carbon sources. It has been found that blast furnace or foundry coke breeze is the best available material from the point view of both cost and technical performance. Other materials which may be used include crushed and ground coarse coke, calcined petroleum coke, scrap electrodes, anthracite coal fines, and soft coal fines.

The best particle size and distribution of sizes for the preferred pulverized coke may be specified as follows, the mesh sizes being U.S. mesh:

100 percent finer than 14 mesh
65 percent coarser than 100 mesh, and
80 percent coarser than 200 mesh The size distribution between the 14 and 200 mesh should be broad rather than having a peak in a narrow range of sizes. The maximum size of coke particles preferably should not exceed 8 mesh for good bonding thereof to the ferrous material. Of course, pulverized coke, 90 to 95 percent of which does not exceed 8 mesh, with the balance up to ¼ inch in diameter, can be used. It is also preferred that not more than 10 percent of the coke have particle size within the range of −8+14 mesh. On the other hand, the percentage of extreme fines should be controlled to avoid undue viscosity increase or a thixotropic consistency in the coating solution. To avoid this, not more than 25 percent of the coke should be finer than 200 mesh.

The sodium silicate binder provides the continuous phase of the coating of the present invention. Several commercial silicates have been tested which varied in the percentage of water relative to the anhydrous sodium silicate fraction and in the weight ratio of $SiO_2:Na_2O$. Good results have been obtained with $SiO_2:Na_2O$ ratios varying from 1.58:3.85, the preferred being the high end of the range. As the ratio of $SiO_2:Na_2$ increases, the coating strength and adherence increases. Furthermore, the drying rate increases and the cost based on current prices of silicate decreases. A preferred range of ratios of $SiO_2:Na_2O$ is from about 3.2 to about 3.9 to 1. One suitable material is sold by Diamond-Shamrock as sodium silicate, grade 40. This material has an $SiO_2:NaO_2$ ratio of 3.22, a solids content of 38.3 percent, the balance being water, a specific gravity at 20° C. of 41.5° Baume and a viscosity at 20° C. of 206 cps.

In preparing the coating baths of the present invention, the viscosity of the coating liquid must be controlled, together with the carbon content of the liquid, to assure the application of the desired amount of carbon to the ferrous material. For example, a bath containing 25 percent coke and 75 percent sodium silicate does not impart much carbon to fragmentized scrap because the viscosity of the fluid is too low and it runs off. It is, therefore, desirable that the silicate solutions be made to carry as much carbon as possible and to develop sufficient viscosity to promote a high level of retention of the fluid on the ferrous material. As, for example, the coke is raised beyond about 35 percent of the slurry, the viscosity of the slurry begins to climb rapidly. With between 40 percent and 55 percent coke, with the balance sodium silicate, the viscosity is in a useful range. If coke addition exceeds a level of 55 percent then the viscosity becomes excessive and approaches sludge in consistency.

A preferred range of carbon content of the coated ferrous melting stock is from about 3 percent to about 6 percent, by weight. When this preferred range is used, the resulting carbon level of the melted stock approximates the carbon content of melted pig iron or gray cast iron scrap. In this production of malleable cast iron, however, it is necessary to establish a carbon level in the molten product of only about 1.9 percent to 2.5 percent. On the other hand, where it is desired to provide a ferrous melting stock which will serve as a concentrated source of carbon in a melt, levels of as high as 20 percent in the melting stock may be achieved. Levels in excess of about 20 percent are undesirable because the products contribute excessive amounts of binder to the melt. Less than about 2 percent provides little of value, in that these minimum requirements may be readily supplied by other means. The range of about 2 to about 20 percent carbon in the ferrous melting stock is thus established.

The coating material may be applied to the ferrous material by any suitable technique, such as dipping the ferrous material in a bath comprising the coke and silicate, followed by draining. Another method is that of simply pouring the bath over ferrous material to obtain maximum coverage thereof. Another suitable technique is to tumble the ferrous material through a rotary contactor and at the same time introduce the coating liquid into the interior of the vessel by way of several small streams. The liquid wets the surface of uncleaned runof-the-mill scrap with no difficulty and adheres with a fast initial tackiness. In order to achieve a rapid set to a hard surface, a heating step should be supplied. Heating the coated ferrous material from ambient temperature to about 300° F. over a period of from 10 to 15 minutes has been found to provide a dry coating having excellent toughness and high bond strength. Coatings prepared in this manner exhibit no loss of strength over storage temperatures ranging from 5° F. to 150° F., and resistance to water is satisfactory.

The following example further illustrates the present invention.

EXAMPLE I

Pulverized commercial foundry coke was dispersed in a sodium silicate bath to provide a composition containing 45 percent coke, 45 percent of the sodium silicate composition, and 10 percent of added water. The sodium silicate composition had a solids content of 38.3 percent, the balance being water. The sodium silicate had a $SiO_2:Na_2O$ ratio of 3.22:1, a specific gravity at 20° C. of 41.5° Baume and a viscosity of 206 cps. The pulverized coke has the following particle size distribution:

| Size | Weight percent |
| --- | --- |
| −10+14 mesh | 5.9 |
| −14+20 | 14.4 |
| −20+28 | 11.3 |
| −28+35 | 14.2 |
| −35+48 | 9.6 |
| −48+65 | 14.8 |
| −65+100 | 8.0 |
| −100+200 | 8.3 |
| −200 | 13.5 |

Low-carbon steel scrap having a surface-to-mass ratio of 0.8 square feet per pound was dipped in the silicate bath, drained and dried, the wet coating on the scrap going into the drying oven comprising 10.22 percent by weight of the coated scrap. The carbon supplied by this coating, together with the carbon supplied by the low-carbon ferrous scrap totaled 4.8 percent. After a residence time of about 10 minutes in the oven, the coating set to a tough adherent envelope.

A 300 pound charge of the coated scrap described above was placed into a 300 pound arc furnace and full power was applied. The meltdown was fast and smooth. A temperature of 2,850° F. was reached after one hour and seven minutes, and this temperature was held for 5 minutes to complete desulfurization by the 1.7 percent basic slag used. The slag was then skimmed and the furnace tapped into the ladle. A 1.3 percent addition of 75 percent ferrosilicon was added to the ladle as the inoculant. The metal was cast into laboratory test pieces for metallurgical and chemical analysis. The cast iron was of excellent quality and possessed a fine grain and high strength with only moderate chilling tendency. The carbon recovery from the coating on the scrap was in the order of 65 percent; the cast iron contained about 3.20 percent carbon.

It is thought that the high recovery of carbon is due to a number of factors. Carbon pickup during meltdown of the coated scrap is rapid because a high potential for diffusion exists between the carbon-rich coating and the low-carbon steel scrap. The interfacial area for diffusion is large and the diffusional distance is short. Further, the carbon diffusivity through steel becomes appreciable at high temperatures. As the product is heated in the presence of oxidizing furnace gases, the oxidation loss of carbon from the coating is minimized by the coating and the coating also protects the steel from oxidation by the same gases.

I claim:
1. A method of carburizing low-carbon steel scrap, the steps consisting essentially of:
   a. providing low-carbon fragmentized steel scrap from stripped auto bodies and miscellaneous baleable scrap having from 0.7 to 1.4 square feet of surface area per pound of scrap,
   b. coating the scrap with a liquid comprising about 45 percent sodium silicate having a solids content of 38.3 percent and a $SiO_2:Na_2O$ ratio of about 3.22:1, about 45 percent of pulverized coke, the particle size of a major portion of which does not exceed 8 mesh, and 10 percent water, the coating being applied at a rage sufficient to provide a final coated scrap product containing about 3–6 percent carbon,
   c. drying the coating to form an adherent coating on the scrap,
   d. feeding the scrap with the dry adherent coating thereon to a furnace, and
   e. melting the coated scrap to provide an iron bath having about 2–5 percent carbon.

2. In a method of making an improved ferrous melting stock by carburizing low-carbon steel scrap, the steps consisting essentially of:
   a. providing low-carbon fragmentized steel scrap from stripped auto bodies and a miscellaneous baleable scrap having from 0.7 to 1.4 square feet of surface area per pound of scrap,
   b. coating the scrap with a liquid comprising about 45 percent sodium silicate having a solids content of 38.3 percent and a $SiO_2:Na_2O$ ratio of 3.22:1, about 45 percent of pulverized coke, the particle size of a major portion of which does not exceed 8 mesh, and 10 percent water, the coating being applied at a rate sufficient to provide a final coated scrap product containing about 3–6 percent carbon, and
   c. drying the coating to from an adherent coating on the scrap.